United States Patent
Duan et al.

(10) Patent No.: US 7,570,970 B2
(45) Date of Patent: Aug. 4, 2009

(54) MOBILE STATION DEVICE, AND UPSTREAM CIRCUIT POWER CONTROL METHOD

(75) Inventors: Jinsong Duan, Kanagawa (JP); Hidenori Kayama, Kanagawa (JP)

(73) Assignee: Panasonic Corporation, Osaka (JP)

( * ) Notice: Subject to any disclaimer, the term of this patent is extended or adjusted under 35 U.S.C. 154(b) by 395 days.

(21) Appl. No.: 11/575,017

(22) PCT Filed: Jun. 22, 2005

(86) PCT No.: PCT/JP2005/011424

§ 371 (c)(1), (2), (4) Date: Mar. 9, 2007

(87) PCT Pub. No.: WO2006/030571

PCT Pub. Date: Mar. 23, 2006

(65) Prior Publication Data

US 2008/0057994 A1  Mar. 6, 2008

(30) Foreign Application Priority Data

Sep. 13, 2004  (JP) ............................. 2004-265491

(51) Int. Cl.
   *H04B 7/00* (2006.01)
(52) U.S. Cl. .......................... 455/522; 455/68; 455/69; 455/67.11; 455/70; 370/318
(58) Field of Classification Search ................. 455/522, 455/67.11, 68–70; 370/318
See application file for complete search history.

(56) References Cited

U.S. PATENT DOCUMENTS 5,873,780 A    2/1999   Nobuyuki et al.
(Continued)

FOREIGN PATENT DOCUMENTS

EP      0680160        4/1995
(Continued)

OTHER PUBLICATIONS

PCT International Search Report dated Aug. 9, 2005.

*Primary Examiner*—Duc Nguyen
*Assistant Examiner*—Dominic E Rego
(74) *Attorney, Agent, or Firm*—Dickinson Wright, PLLC

(57) ABSTRACT

A mobile station device for selecting a TPC command to improve the transmission quality of a packet in an upstream circuit more reliably, so that it reduces the re-transmission in the upstream circuit to improve a sector throughput. In this mobile station device, a demodulate unit (210) outputs a received signal of each base station device to an error correction decode unit (220) and a TPC command select unit (240). The error correction decode unit (220) outputs an ACK/NACK of each base station device to a data re-transmission control unit (230) and the TPC command select unit (240). The TPC command select unit (240) selects the TPC command of the highest priority on the basis of the information of the ACK/NACK. A transmission power control unit (280) determines the transmission power according to the contents of the TPC command of the highest priority. Moreover, the transmission power control unit (280) determines the transmission power by an or-of-down method, in case a plurality of TPC commands of the highest priority are outputted from the TPC command select unit (240).

12 Claims, 10 Drawing Sheets

U.S. PATENT DOCUMENTS

| | | | |
|---|---|---|---|
| 6,233,439 B1 * | 5/2001 | Jalali | 455/127.2 |
| 2002/0046379 A1 | 4/2002 | Nobuhiko et al. | |
| 2002/0067701 A1 * | 6/2002 | Chen et al. | 370/318 |
| 2003/0100268 A1 * | 5/2003 | Moulsley et al. | 455/69 |
| 2004/0005906 A1 | 1/2004 | Okumura et al. | |
| 2004/0131021 A1 | 7/2004 | Hideki et al. | |
| 2004/0203980 A1 * | 10/2004 | Das et al. | 455/522 |
| 2005/0009551 A1 * | 1/2005 | Tsai et al. | 455/522 |
| 2005/0037796 A1 * | 2/2005 | Tsai et al. | 455/522 |
| 2005/0043051 A1 * | 2/2005 | Takano et al. | 455/522 |
| 2005/0250526 A1 * | 11/2005 | Lindoff et al. | 455/522 |

FOREIGN PATENT DOCUMENTS

| | | |
|---|---|---|
| JP | 8018503 | 1/1996 |
| JP | 09312609 | 12/1997 |
| JP | 2002/009741 | 1/2002 |
| JP | 2003/244063 | 8/2003 |
| JP | 2004/215058 | 7/2004 |
| WO | 03 010903 | 2/2003 |

* cited by examiner

| BASE STATION APPARATUS  TTI | BASE STATION APPARATUS #1 | BASE STATION APPARATUS #2 | BASE STATION APPARATUS #3 |
|---|---|---|---|
| TTI #0 | ACK | NACK | ACK |
| TTI #1 | ACK | NACK | NACK |
| TTI #2 | NACK | ACK | ACK |
| TTI #3 | ACK | NACK | NACK |
| ⋮ | ⋮ | ⋮ | ⋮ |

| TTI \ BASE STATION APPARATUS | BASE STATION APPARATUS #1 | BASE STATION APPARATUS #2 | BASE STATION APPARATUS #3 |
|---|---|---|---|
| TTI #0 | ACK | NACK | ACK |
| TTI #1 | ACK | NACK | NACK |
| TTI #2 | NACK | ACK | ACK |
| TTI #3 | ACK | NACK | NACK |
| ⋮ | ⋮ | ⋮ | ⋮ |
| TOTAL NUMBER OF ACKs | 3 | 1 | 2 |

| TTI \ BASE STATION APPARATUS | BASE STATION APPARATUS #1 | BASE STATION APPARATUS #2 | BASE STATION APPARATUS #3 |
|---|---|---|---|
| TTI #0 | ACK | NACK | ACK |
| TTI #1 | ACK | NACK | NACK |
| TTI #2 | NACK | ACK | ACK |
| TTI #3 | ACK | NACK | NACK |
| ⋮ | ⋮ | ⋮ | ⋮ |
| AVERAGE | 0.75 | 0.25 | 0.5 |

| TPC COMMAND OF BASE STATION APPARATUS B1 | TPC COMMAND OF BASE STATION APPARATUS B2 | TRANSMISSION POWER OF MOBILE STATION APPARATUS M |
|---|---|---|
| Down | Down | DECREASE |
| Down | Up | DECREASE |
| Up | Down | DECREASE |
| Up | Up | INCREASE | ial
MOBILE STATION DEVICE, AND UPSTREAM CIRCUIT POWER CONTROL METHOD

TECHNICAL FIELD

The present invention relates to a mobile station apparatus and uplink transmission power control method, and more particularly to a mobile station apparatus and uplink transmission power control method for executing soft handover during movement between cells.

BACKGROUND ART

In recent years, HSUPA (High Speed Uplink Packet Access) has been studied as a transmission standard for enhancing the uplink packet communication speed on W-CDMA (Wideband-Code Division Multiple Access). In HSUPA, E-DCH (Enhanced-Dedicated CHannel) is provided as a dedicated channel for the transmission of uplink packets.

Although a mobile station apparatus sends packets to a base station apparatus using E-DCH, since the appropriate transmission power for mobile station apparatus packet transmission differs according to the distance between the mobile station apparatus and base station apparatus, typically E-DCH transmission power control (TPC) is performed in the same manner as conventional uplink transmission power control. One example of a transmission power control method is the closed-loop transmission power control. With closed-loop transmission power control of an uplink, the base station apparatus measures the link quality using a signal received from the mobile station apparatus, compares the measured link quality with the target link quality, and transmits to the mobile station apparatus a TPC command that instructs an increase or decrease in the transmission power so as to bring the measured link quality closer to the target link quality. The mobile station apparatus then increases or decreases the transmission power in accordance with the TPC command transmitted from the base station apparatus.

However, during movement between cells covered by the base station apparatus, the mobile station apparatus sometimes performs a soft handover to communicate with a plurality of base station apparatuses. That is, for example, as shown in FIG. 14, when mobile station apparatus M is positioned near the border of cell C1 and cell C2, mobile station apparatus M communicates with both base station apparatus B1 which covers cell C1 and base station apparatus B2 which covers cell C2. At this time, when the above-mentioned closed-loop transmission power control is performed, mobile station apparatus M receives a TPC command from both base station apparatus B1 and base station apparatus B2. In such a case, the contents of the respective TPC commands transmitted from base station apparatus B1 and base station apparatus B2 may conflict due to the difference in the propagation environment of the receptive cells.

Here, with the technology, for example, disclosed in Patent Document 1, when TPC commands are transmitted from a plurality of base station apparatuses during a soft handover and at least one of the base station apparatuses instructs the mobile station apparatus to decrease the transmission power, the mobile station apparatus selects the TPC command of that base station apparatus to decrease the transmission power. That is, in the above-mentioned example, as shown in FIG. 15, when at least base station apparatus B1 or base station apparatus B2 transmits the TPC command "Down," which instructs decrease in transmission power, the transmission power of mobile station apparatus M is decreased. Only when both base station apparatus B1 and base station apparatus B2 transmit the TPC command "Up", which instructs an increase in transmission power, the transmission power of mobile station apparatus M is increased.

The method is referred to as the "or of down" method where a mobile station apparatus, upon receiving TPC commands from a plurality of base station apparatuses, selects the TPC command of the base station apparatus to decrease the transmission power if "Down" is transmitted from at least one such base station apparatus as described above. According to the "or of down" method, even though the mobile station apparatus has excessive transmission power for only one of the base station apparatuses (i.e., the base station apparatus that transmits the "Down" command) of a communication party, the mobile station apparatus will not further increase the transmission power, thereby preventing a great increase in interference in the overall system and increasing subscriber capacity.

In addition, in Patent Document 2, a method is disclosed where the mobile station apparatus measures the link quality of the downlink and then applies the "or of down" method while ignoring the TPC commands transmitted on downlinks of inferior link quality.

Patent Document 1: Japanese Patent Application Laid-Open No. HEI8-18503
Patent Document 2: Japanese Patent Application Laid-Open No. HEI9-312609

DISCLOSURE OF THE INVENTION

Problems to be Solved by the Invention

Nevertheless, in the above-mentioned conventional technologies, the problem exists that the propagation environment of the uplink is not given sufficient consideration in the selection of the TPC command to be employed by the mobile station apparatus during actual transmission power control from the plurality of TPC commands transmitted during a soft handover. That is, in the above-mentioned conventional technologies, the TPC command used for actual transmission power control is selected based on either the content of the TPC command in which only the link quality of the uplink is reflected or the link quality of the downlink in which the TPC command is transmitted.

The TPC command transmitted by the base station apparatus is generated by measuring the link quality of the uplink and therefore simply reflects the comparison result of the measured link quality and the established target link quality retained in advance according to the base station apparatus; it is not a direct reflection of the transmission quality of the uplink packet. Thus, with only the "or of down" method based on the contents of the TPC command, the transmission quality of the packet of the uplink does not necessarily improve.

It is therefore an object of the present invention to provide a mobile station apparatus and uplink transmission power control method capable of selecting the TPC command that improves the transmission quality of the uplink packet more reliably, thereby reducing uplink retransmission and improving sector throughput as a result.

Means for Solving the Problem

The mobile station apparatus according to the present invention employs a configuration having a reception section that receives from a plurality of base station apparatuses receipt acknowledgement responses and transmission power control commands for an uplink signal, a selection section that selects from a plurality of the received transmission power control commands the transmission power control command of highest priority using a plurality of the received receipt acknowledgement responses, and a control section that controls the transmission power in accordance with the selected transmission power control command.

The uplink transmission power control method according to the present invention comprises the steps of receiving from a plurality of base station apparatuses receipt acknowledgement responses and transmission power control commands for an uplink signal, selecting from a plurality of the received transmission power control commands the transmission power control command of highest priority using a plurality of the received receipt acknowledgement responses, and controlling the transmission power in accordance with the selected transmission power control command.

ADVANTAGEOUS EFFECT OF THE INVENTION

According to the present invention, it is possible to select the TPC command that improves the transmission quality of the uplink packet more reliably, thereby reducing uplink retransmission and improving sector throughput as a result.

BEST MODE FOR CARRYING OUT THE INVENTION

The inventors of the present invention noted that, similar to HSDPA (High Speed Downlink Packet Access), HARQ (Hybrid Automatic Repeat reQuest) is effective in the uplink retransmission control of HSUPA. Furthermore, the inventors noted that in HARQ of HSUPA, the base station apparatus transmits to the mobile station apparatus the receipt acknowledgement response ACK/NACK for packets transmitted on the uplink.

Then, the inventors of the present invention discovered that ACK/NACK transmitted by the base station apparatus to the mobile station apparatus is directly indicative of the transmission quality of the uplink packet and that packet retransmission can be reduced by controlling the transmission power in accordance with the TPC command from the base station apparatus having a favorable uplink packet transmission quality, and realized the present invention.

Now embodiments of the present invention will be described in detail with reference to the accompanying drawings.

Embodiment 1

Figure 1:
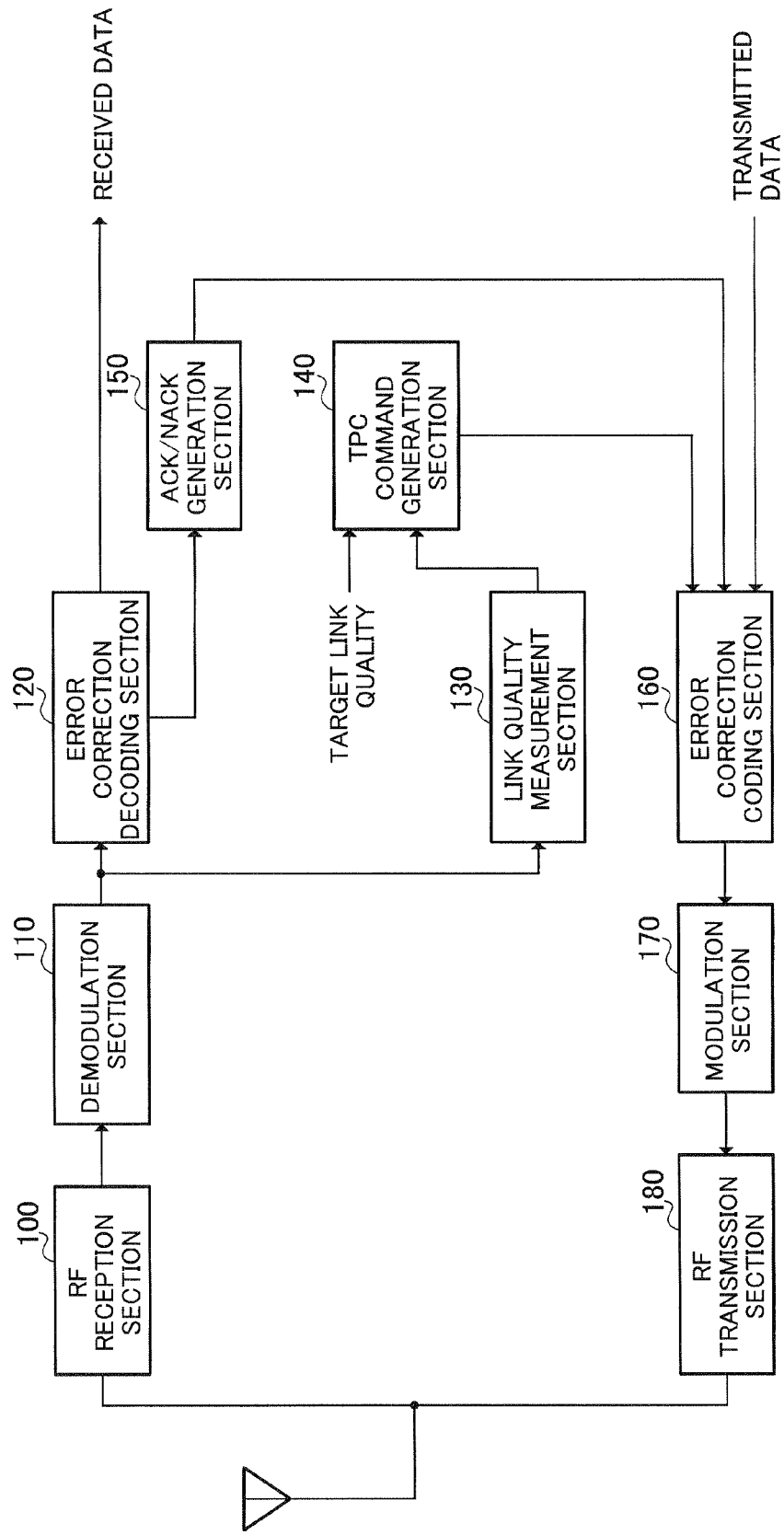
FIG. 1 is a block diagram showing the configuration of the relevant parts of the base station apparatus according to Embodiment 1 of the present invention.

FIG. 1 is a block diagram showing the configuration of the relevant parts of the base station apparatus according to Embodiment 1 of the present invention. As shown in the figure, the base station apparatus according to the present embodiment comprises RF (Radio Frequency) reception section 100, demodulation section 110, error correction decoding section 120, link quality measurement section 130, TPC command generation section 140, ACK/NACK generation section 150, error correction coding section 160, modulation section 170, and RF transmission section 180.

RF reception section 100 receives an uplink packet transmitted from a mobile station apparatus via an antenna and subjects the received packet to certain radio reception processing (down conversion, A/D conversion, etc.).

Demodulation section 110 demodulates and outputs the received packet to error correction decoding section 120 and link quality measurement section 130.

Error correction decoding section 120 detects and corrects errors in the received packet after demodulation using, for example, CRC (Cyclic Redundancy Check) code, outputs the data received from the received packet after error correction, and outputs the error detection result to ACK/NACK generation section 150.

Link quality measurement section 130 measures the link quality of the uplink, such as the SIR (Signal to Interference Ratio), using the received packet after demodulation.

TPC command generation section 140 compares the link quality measured by link quality measurement section 130 with the target link quality retained in advance, and generates a TPC command corresponding to the comparison result. Specifically, TPC command generation section 140 generates the TPC command "Up", which instructs an increase in transmission power, if the measured link quality does not meet the target link quality, and generates the TPC command "Down", which instructs a decrease in transmission power, if the measured link quality exceeds the target link quality.

ACK/NACK generation section 150 generates the receipt acknowledgement response ACK or NACK in accordance with the error detection result output from error correction decoding section 120. Specifically, as a result of the error detection, ACK/NACK generation section 150 generates ACK if there is no error in received data and NACK if there is an error in received data.

Error correction coding section 160 performs error correction coding on the transmitted signal obtained from mapping ACK/NACK, the TPC command, and the transmitted data using, for example, CRC code.

Modulation section 170 modulates and outputs to RF transmission section 180 the transmitted signal after error correction coding.

RF transmission section 180 subjects the transmitted signal to certain radio transmission processing (D/A conversion, up conversion, etc.), and transmits the transmitted signal to the mobile station apparatus via an antenna.

Figure 2:
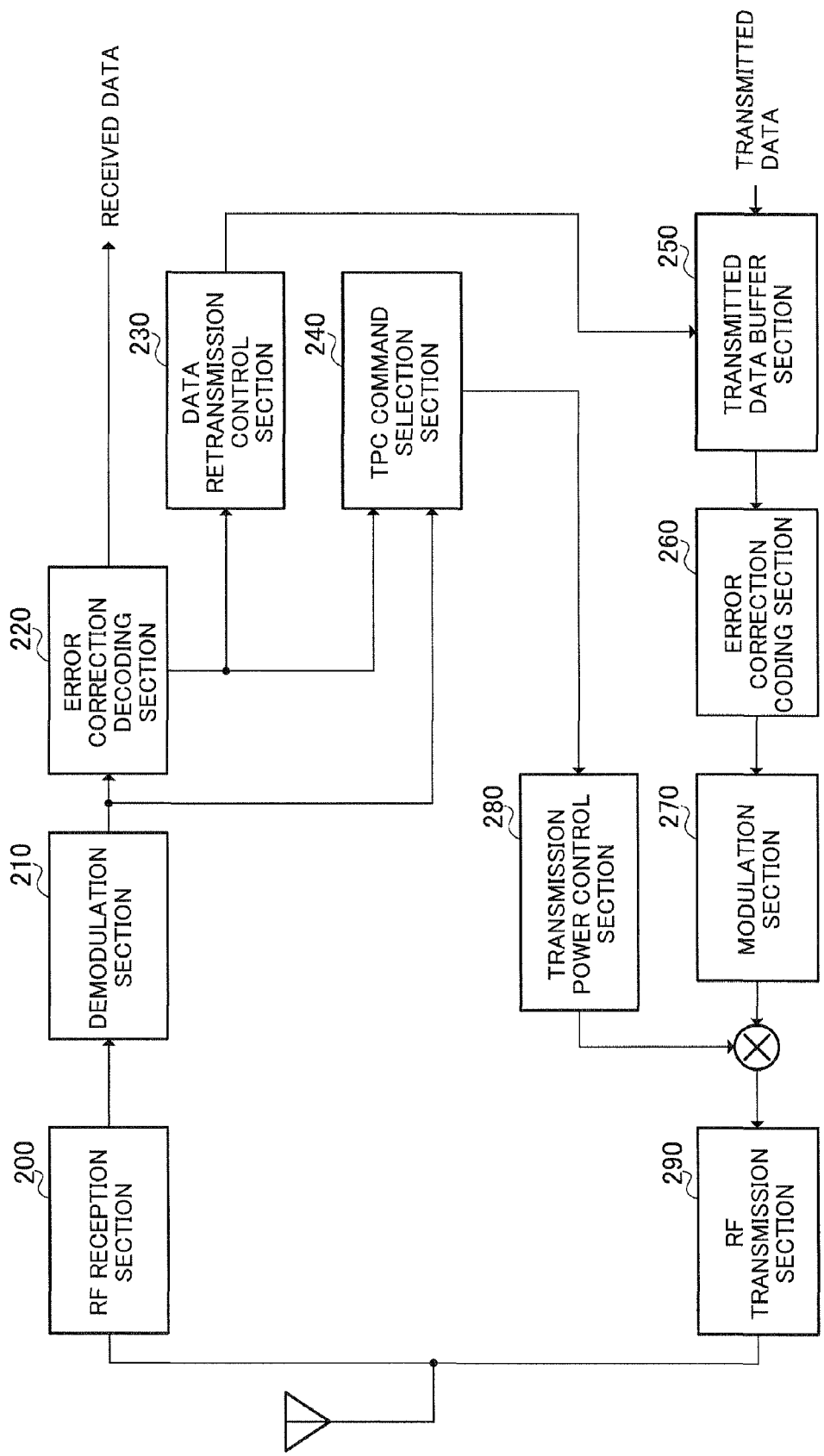
FIG. 2 is a block diagram showing the configuration of the relevant parts of the mobile station apparatus according to Embodiment 1.

FIG. 2 is a block diagram showing the configuration of the relevant parts of the mobile station apparatus according to Embodiment 1. As shown in the figure, the mobile station apparatus according to the present embodiment comprises RF reception section 200, demodulation section 210, error correction decoding section 220, data retransmission control section 230, TPC command selection section 240, transmitted data buffer section 250, error correction coding section 260, modulation section 270, transmission power control section 280, and RF transmission section 290.

RF reception section 200 receives via an antenna a signal transmitted from the base station apparatus and subjects the received signal to certain radio reception processing (down conversion, A/D conversion, etc.). Furthermore, RF reception section 200 receives signals transmitted from a plurality of base station apparatuses during a soft handover of the mobile station apparatus.

Demodulation section 210 demodulates and outputs the received signal to error correction decoding section 220 and TPC command selection section 240. Furthermore, demodulation section 210 outputs the received signal of each base station apparatus corresponding to the plurality of base station apparatuses to error correction decoding section 220 and TPC command selection section 240 during a soft handover of the mobile station apparatus.

Error correction decoding section 220 detects and corrects errors in the received signal after demodulation using, for example, CRC code, outputs the data received from the received signal after error correction, and outputs the ACK/NACK included in the received data to data retransmission control section 230 and TPC command selection section 240. Furthermore, error correction decoding section 220 outputs the ACK/NACK of each base station apparatus corresponding to the plurality of base station apparatuses to data retransmission control section 230 and TPC command selection section 240 during a soft handover of the mobile station apparatus.

Data retransmission control section 230 determines whether or not a packet is retransmitted in accordance with ACK/NACK output from error correction decoding section 220, and notifies transmitted data buffer section 250 of packet retransmission or no packet retransmission. Specifically, when ACK is output from error correction decoding section 220, data retransmission control section 230 notifies transmitted data buffer section 250 that the next packet is transmitted, thereby indicating that the packet transmitted from the mobile station apparatus was correctly transmitted to a base station apparatus. On the other hand, when only NACK is output from error correction decoding section 220, data retransmission control section 230 notifies transmitted data buffer section 250 that the packet is retransmitted, thereby indicating that the packet transmitted from the mobile station apparatus was incorrectly transmitted to all base station apparatuses.

TPC command selection section 240 extracts and outputs the TPC command included in the received signal to transmission power control section 280. In addition, during a soft handover of the mobile station apparatus, TPC command selection section 240 selects from the TPC commands transmitted from a plurality of base station apparatuses the TPC command of highest priority to be employed with priority at the time of actual transmission power control, based on the ACK/NACK information. The internal configuration and operation of TPC command selection section 240 will be described hereinafter.

Transmitted data buffer section 250 temporarily stores data already transmitted and outputs the transmitted data to error correction coding section 260. In addition, transmitted data buffer section 250 discards the stored transmitted data when data retransmission control section 230 notifies that next packet is transmitted, and outputs the stored transmitted data to error correction coding section 260 once again when data retransmission control section 230 notifies that packet is retransmitted.

Error correction coding section 260 performs error correction coding on transmitted data output from transmitted data buffer section 250 using, for example, CRC code. Furthermore, error correction coding section 260 may change the coding rate in the case of packet retransmission to decrease the possibility of errors occurring during transmission of the packet subject to retransmission.

Modulation section 270 modulates and outputs to RF transmission section 290 the transmitted data after error correction coding. Furthermore, modulation section 270 may change the modulation method in the case of packet retransmission to decrease the possibility of errors occurring during transmission of the packet subject to retransmission.

Transmission power control section 280 determines the transmission power in accordance with the content of the TPC command of highest priority output from TPC command selection section 240, and controls the transmission power of the transmitted data. Specifically, transmission power control section 280 increases the current transmission power when the TPC command is "UP", and decreases the current transmission power when the TPC command is "Down". In addition, transmission power control section 280 determines the transmission power according to the "or of down" method when a plurality of TPC commands of highest priority are output from TPC command selection section 240. That is, transmission power control section 280 decreases the current transmission power when the plurality of TPC commands includes one or more "Down" commands.

RF transmission section 290 subjects the transmitted signal subjected to transmission power control to certain radio transmission processing (D/A conversion, up conversion, etc.), and transmits the signal after packetizing to the base station apparatus via an antenna.

Next, the internal configuration of TPC command selection section 240 of the mobile station apparatus according to the present embodiment will be described with reference to FIG. 3.

Figure 3:
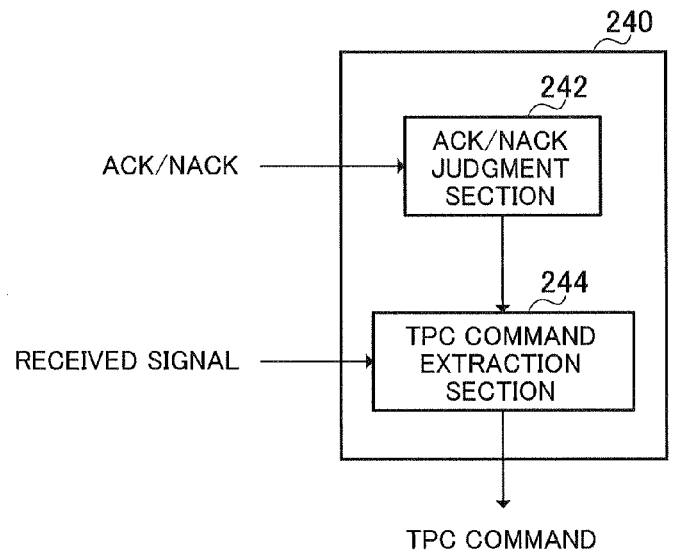
FIG. 3 is a block diagram showing the internal configuration of the TPC command selection section according to Embodiment 1.

As shown in FIG. 3, TPC command selection section 240 comprises ACK/NACK judgment section 242 and TPC command extraction section 244. ACK/NACK judgment section 242 and TPC command extraction section 244 mainly operate during a soft handover of the mobile station apparatus (that is, when the mobile station apparatus receives signals from a plurality of base station apparatuses).

ACK/NACK judgment section 242, with respect to the ACK/NACK of each base station apparatus output from error correction decoding section 220, judges whether or not ACK was transmitted or NACK was transmitted from each respective base station apparatus. At this time, ACK/NACK judgment section 242 judges the most recently received ACK/NACK. In this manner, based on the judgment of the most recent ACK/NACK, ACK/NACK is reliably used as an indicative of the most recent uplink propagation environment, even when there is variance in the timing of data retransmission control and transmission power control processing.

Then, ACK/NACK judgment section 242 judges that the transmission quality of an uplink packet of a base station apparatus that transmitted ACK is favorable, sets the TPC command of the base station apparatus that transmitted ACK as the TPC of highest priority, and instructs TPC command extraction section 244 to extract this TPC command.

TPC command extraction section 244 extracts from the TPC commands included in the received signals of each base station apparatus the TPC command of the base station apparatus for which extraction was instructed, and outputs that TPC command to transmission power control section 280.

Next, the TPC command selection operation during a soft handover of the mobile station apparatus configured as described above will be described in detail with reference to FIG. 4 and FIG. 5.

First, the operation performed up to the moment the TPC command and ACK/NACK are transmitted from the base station apparatus to the mobile station apparatus will be described.

In the base station apparatus shown in FIG. 1, when RF reception section 100 receives a packet transmitted from the mobile station apparatus, demodulation section 110 demodulates the received packet after certain radio reception processing is performed. Error correction decoding section 120 detects and corrects errors in the demodulated received packet, outputs the received data, and outputs the error detection results to ACK/NACK generation section 150. Then, ACK/NACK generation section 150 generates ACK if there is no error in the received packet, or generates NACK if there is an error in the received packet. ACK/NACK generation section 150 then outputs the generated ACK/NACK to error correction coding section 160.

On the other hand, link quality measurement section 130 measures the link quality of the uplink based on the demodulated received packet. TPC command generation section 140 compares the measured link quality with the established target link quality, and generates the TPC command "Up" if the measured link quality is lower or the TPC command "Down" if the measured link quality is higher. TPC command generation section 140 then outputs the generated TPC command to error correction coding section 160.

Next, error correction coding section 160 performs error correction coding on the transmitted signal comprising the transmitted data, ACK/NACK, and the TPC command, modulation section 170 modulates the transmitted signal, and RF transmission section 180 transmits the signal to the mobile station apparatus via an antenna after certain radio transmission processing is performed.

Here, because the mobile station apparatus is performing a soft handover, a packet transmitted from a single mobile station apparatus is received by a plurality of base station apparatuses. Here, in the following description, the mobile station apparatus performing the soft handover communicates with, for example, the three base station apparatuses base station apparatus #1, base station apparatus #2, and base station apparatus #3. These base station apparatuses #1 to #3 generate and transmit to the mobile station apparatus ACKs/ NACKs and TPC commands based on the above-mentioned operation, respectively. At this time, the propagation environment of the uplink between the mobile station apparatus and base station apparatuses #1 to #3 differs per base station apparatus and thus base station apparatuses #1 to #3 do not necessarily transmit the same ACKs/NACKs and TPC commands.

Next, the operation where the mobile station apparatus selects the TPC command to perform transmission power control under such conditions will be described.

The signals transmitted by base station apparatuses #1 to #3 are received by the mobile station apparatus shown in FIG. 2. Specifically, after RF reception section 200 receives the signals and certain radio reception processing is performed, demodulation section 210 demodulates the received signals corresponding to the respective base station apparatuses #1 to #3. The demodulated received signal of each base station apparatus is output to error correction decoding section 220 and TPC command extraction section 244 (FIG. 3) of TPC command selection section 240.

Error correction decoding section 220 detects and corrects errors in the demodulated received signal of each base station apparatus, outputs the received data, and outputs the ACK or NACK of each base station apparatus to data retransmission control section 230 and ACK/NACK judgment section 242 of TPC command selection section 240. Then, data retransmission control section 230 notifies transmitted data buffer section 250 that the packets are to be retransmitted when NACK is transmitted from all base station apparatuses #1 to #3, or that the next packet is to be transmitted when ACK is transmitted from one or more base station apparatuses #1 to #3.

Figure 4:
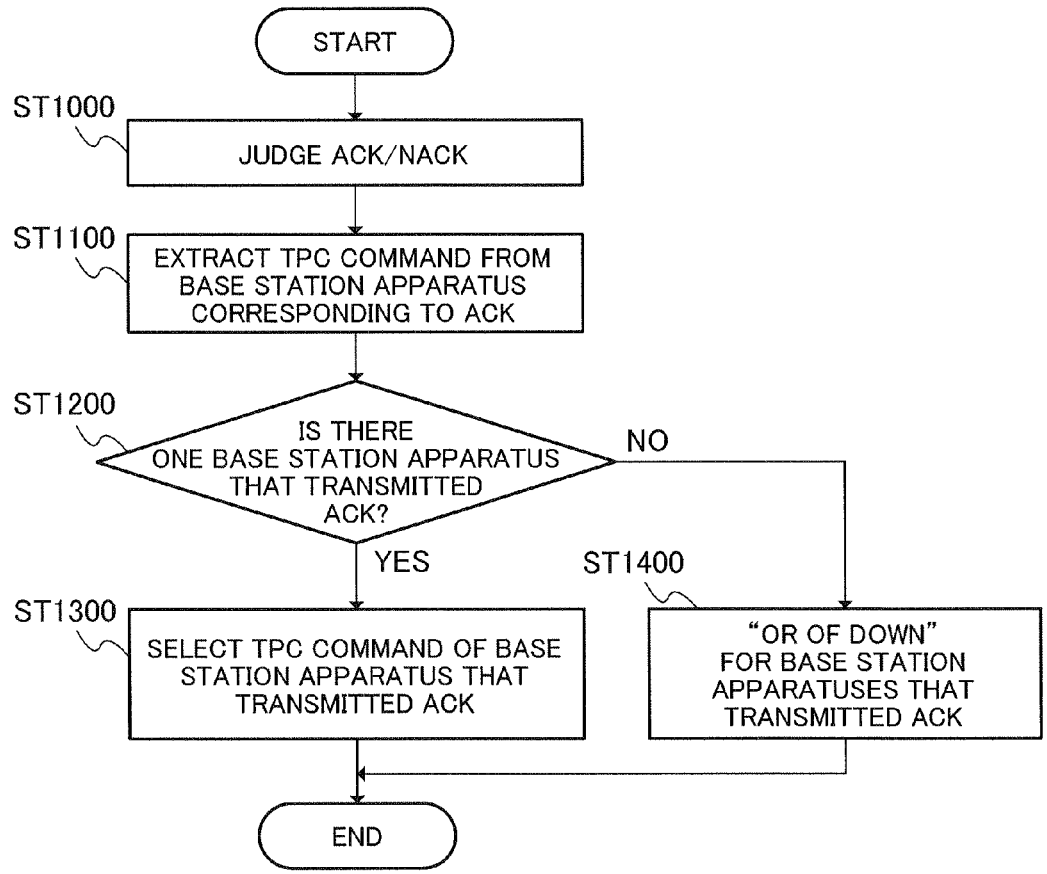
FIG. 4 is a flow chart showing the TPC command selection operation according to Embodiment 1.

On the other hand, TPC command selection section 240 selects the TPC command to be employed for actual transmission power control in accordance with the flow shown in FIG. 4.

That is, first ACK/NACK judgment section 242 judges whether ACK or NACK was transmitted from the respective base station apparatuses #1 to #3 (ST1000). At this time, the ACK/NACK to be judged by ACK/NACK judgment section 242 is the most recently received ACK/NACK of each base station apparatus. That is, when the history of ACK/NACK per transmission time interval (TTI) is as shown in FIG. 5 for example, ACK/NACK judgment section 242 judges the ACK or NACK of the most recent TTI #0 framed in by dashed line 300. As a result, the ACK/NACK that reflects the most recent uplink state is always used to select the TPC command.

Figures 5, 6:
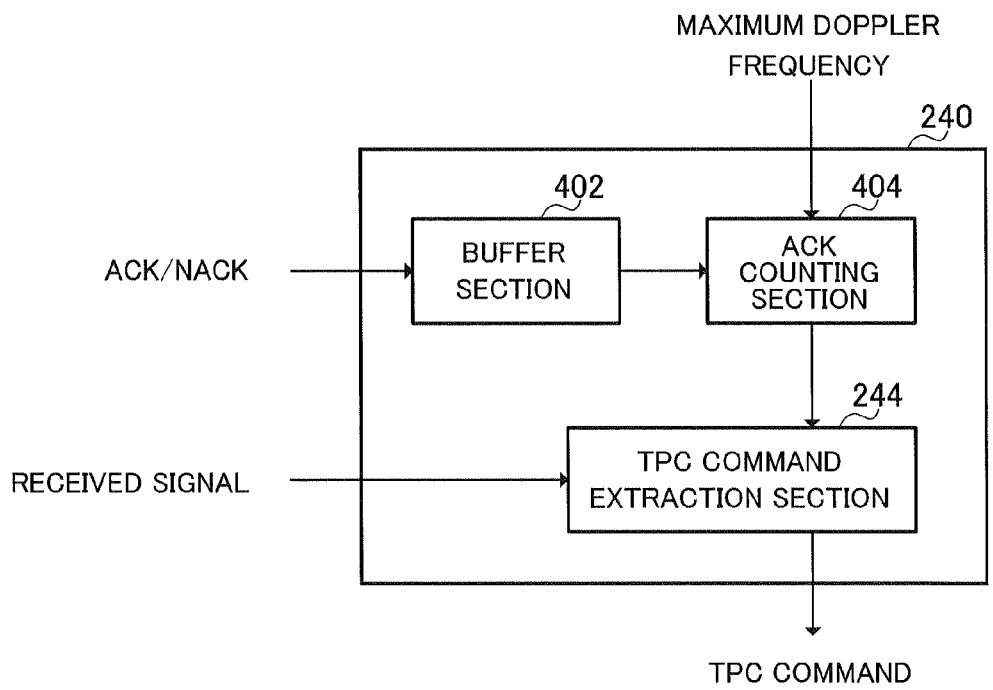
FIG. 5 is a diagram showing an example of the history of ACK/NACK according to Embodiment 1.
FIG. 6 is a block diagram showing the internal configuration of the TPC command selection section according to Embodiment 2 of the present invention.

In FIG. 5, the propagation environments of the uplinks of base station apparatus #1 and base station apparatus #3 which transmitted ACK are judged as more favorable than that of base station apparatus #2 and judged that packet transmitted from the mobile station apparatus is correctly transmitted. Thus, by performing transmission power control in accordance with the TPC command from such a base station apparatus, the favorable uplink packet transmission quality can be maintained and the number of retransmissions can be reduced.

Here, ACK/NACK judgment section 242 determines that the TPC commands from base station apparatus #1 and base station apparatus #3, which transmitted ACK, have the highest priority among base station apparatuses #1 to #3. Furthermore, ACK/NACK judgment section 242 instructs TPC command extraction section 244 to extract the TPC commands transmitted from these base station apparatuses. Then, TPC command extraction section 244 extracts the TPC commands from base station apparatus #1 and base station apparatus #3 (ST1100) for output to transmission power control section 280.

Next, transmission power control section 280 judges whether or not only one TPC command of highest priority was extracted (ST1200). When results indicate there is one extracted TPC command, in other words, when ACK was transmitted from only one base station apparatus, transmission power control is performed in accordance with the TPC command from that base station apparatus.

On the other hand, as shown in FIG. 5, when ACK is transmitted from the two base station apparatuses base station apparatus #1 and base station apparatus #3 and the corresponding two TPC commands are extracted, the "or of down" method is applied to the TPC commands of these base station apparatuses (ST1400). That is, even if just one of the two base station apparatuses base station apparatus #1 or base station apparatus #3 transmits "Down" as the TPC command, transmission power control section 280 decreases the current transmission power. Or, when both base station apparatus #1 and base station apparatus #3 transmits "Up" as the TPC command, transmission power control section 280 increases the current transmission power.

Then, the transmitted data or retransmitted data transmitted via transmitted data buffer section 250, error correction coding section 260, and modulation section 270 are transmitted from RF transmission section 290 via an antenna upon packetizing using the transmission power controlled as described above.

In this manner, according to the present embodiment, the most recent ACKs/NACKs transmitted from the plurality of respective base station apparatuses are judged, the TPC commands transmitted from the base station apparatuses that transmitted ACK are given highest priority, and the TPC command that improves the transmission quality of the uplink packet more reliably is selected in reflection of the most recent uplink propagation environment for actual transmission power control by the mobile station apparatus, thereby decreasing the number of uplink retransmissions and improving sector throughput.

Embodiment 2

Embodiment 2 of the present invention is characterized in that the number of ACKs transmitted within a certain period of time is regarded as the score of the base station apparatus, and the mobile station apparatus performs transmission power control by prioritizing the TPC command from the base station apparatus that transmitted the greatest number of ACKs.

The configuration of the base station apparatus according to the present embodiment is the same as that of the base station apparatus (FIG. 1) according to Embodiment 1, and the description thereof is omitted. In addition, the configuration of the mobile station apparatus according to the present embodiment is the same as that of the mobile station apparatus (FIG. 2) according to Embodiment 1, with only the internal configuration of TPC command selection section 240 differing from that of Embodiment 1.

Now the internal configuration of TPC command selection section 240 of the mobile station apparatus according to the present embodiment will be described with reference to FIG. 6. The parts of FIG. 6 that are the same as those of FIG. 3 are given the same numerals, and descriptions thereof are omitted.

As shown in FIG. 6, TPC command selection section 240 according to the present embodiment comprises buffer section 402, ACK counting section 404, and TPC command extraction section 244. Buffer section 402, ACK counting section 404, and TPC command extraction section 244 mainly operate during a soft handover of the mobile station apparatus.

Buffer section 402 temporarily stores the ACK/NACK of each base station apparatus output from error correction decoding section 220. At this time, buffer section 402 stores whether ACK or NAC was transmitted per base station apparatus and per TTI.

ACK counting section 404 sets the target TTI interval (number of TTIs) for counting ACKs in accordance with the maximum Doppler frequency, which is the fading variation rate index, and counts the number of ACKs corresponding to this TTI interval.

Specifically, ACK counting section 404 sets the period from the most recent TTI to a relatively new TTI as the TTI interval when the maximum Doppler frequency is high and fading variation is fast since the propagation environment presumably changes in a short period of time. On the other hand, ACK counting section 404 sets the period from the most recent TTI to a relatively old TTI as the TTI interval when the maximum Doppler frequency is low and fading variation is slow since the propagation environment presumably does not change over a long period of time.

Then, ACK counting section 404 judges that the transmission quality of the uplink packet of the base station apparatus that transmitted the greatest number of ACKs in the TTI interval is stable and favorable, sets the TPC command of the base station apparatus with the greatest number of ACKs as the TPC command of highest priority, and instructs TPC command extraction section 244 to extract that TPC command.

Next, the TPC command selection operation during a soft handover of the mobile station apparatus configured as described above will be described in detail with reference to FIG. 7 and FIG. 8. Furthermore, in the present embodiment, the operation up until the TPC command and ACK/NACK are transmitted from the base station apparatus to the mobile station apparatus, and the operation up until received signals are demodulated and error corrected by the mobile station apparatus are the same as those of Embodiment 1, and descriptions thereof will be omitted.

Thus, the TPC command selection operation of the TPC command selection section 240 of the mobile station apparatus will now be mainly described.

In the present embodiment, error correction decoding section 220 outputs the ACK/NACK of each base station apparatus to buffer section 402 of TPC command selection section 240. Buffer section 402 stores these ACKs/NACKs as history. Specifically, as shown in FIG. 8 for example, buffer section 402 stores the ACK/NACKs of each TTI of the respective base station apparatuses #1 to #3.

Figure 7:
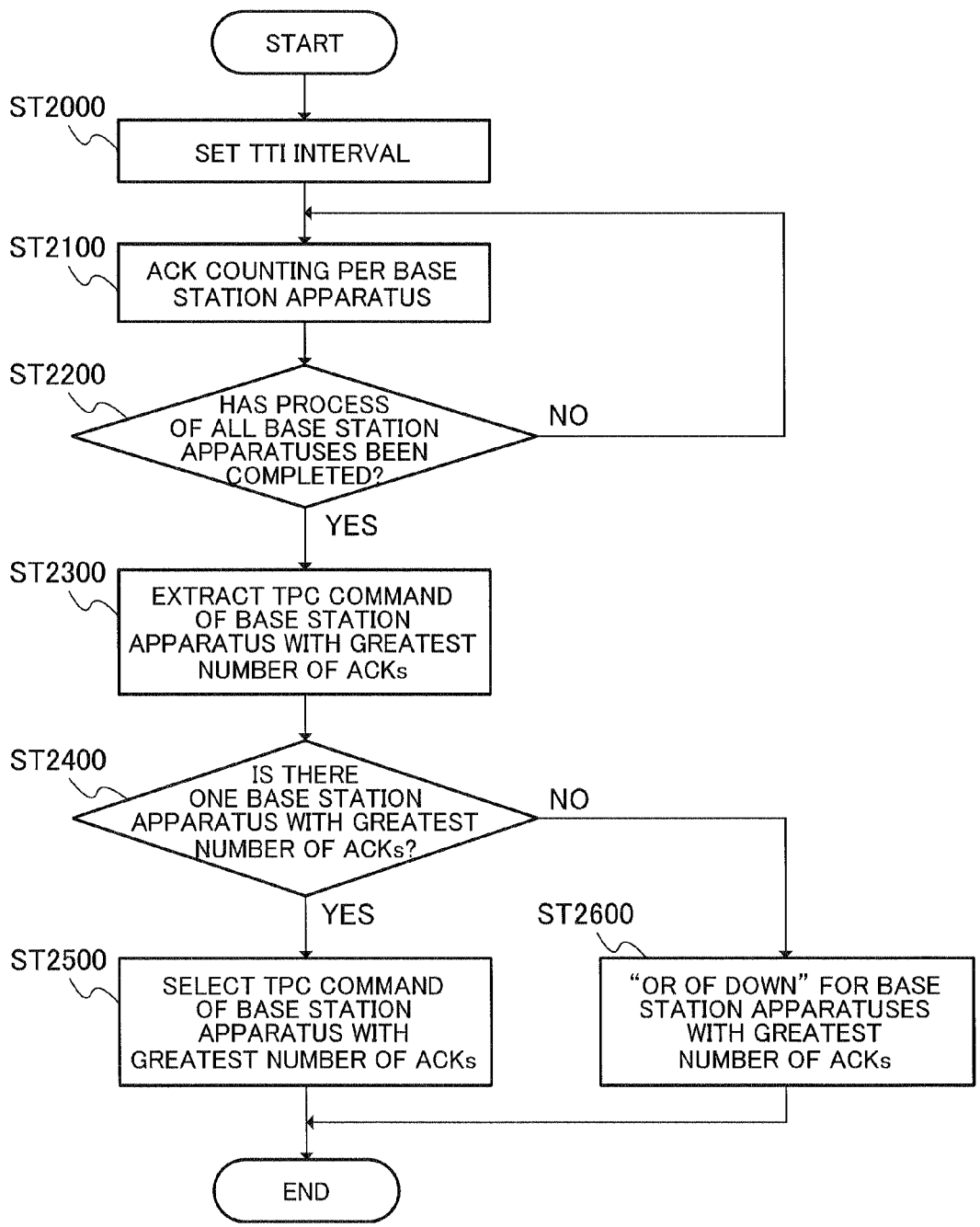
FIG. 7 is a flow chart showing the TPC command selection operation according to Embodiment 2.

Then, TPC command selection section 240 selects the TPC command to be employed for actual transmission power control in accordance with the flow shown in FIG. 7.

That is, first ACK counting section 404 sets the TTI interval in accordance with the maximum Doppler frequency (ST2000). The TTI interval of the present embodiment is the number of TTIs subject to ACK counting, and is set so as to target only relatively new TTIs when the propagation environment changes frequently or up to relatively old TTIs when the propagation environment does not change to a large degree. Thus, a relatively short TTI interval is set when the maximum Doppler frequency is high, and a relatively long TTI interval is set when the maximum Doppler frequency is low.

Then, ACK counting section 404 counts the number of ACKs per base station apparatus in the TTI interval (ST2100), repeating the counting process until ACK counting has been completed for all base station apparatuses (ST2200). In the example shown in FIG. 8, the four TTIs TTI #0 to TTI #3 framed in by the dashed line are set as TTI interval 500, and first the ACKs of base station apparatus #1 are counted and the result 3 is obtained, next the ACKs of base station apparatus #2 are counted and 1 is obtained, and finally the ACKs of base station apparatus #3 are counted and 2 is obtained. These numbers of ACKs are established as the scores of the respective base station apparatuses.

Figures 8, 9:
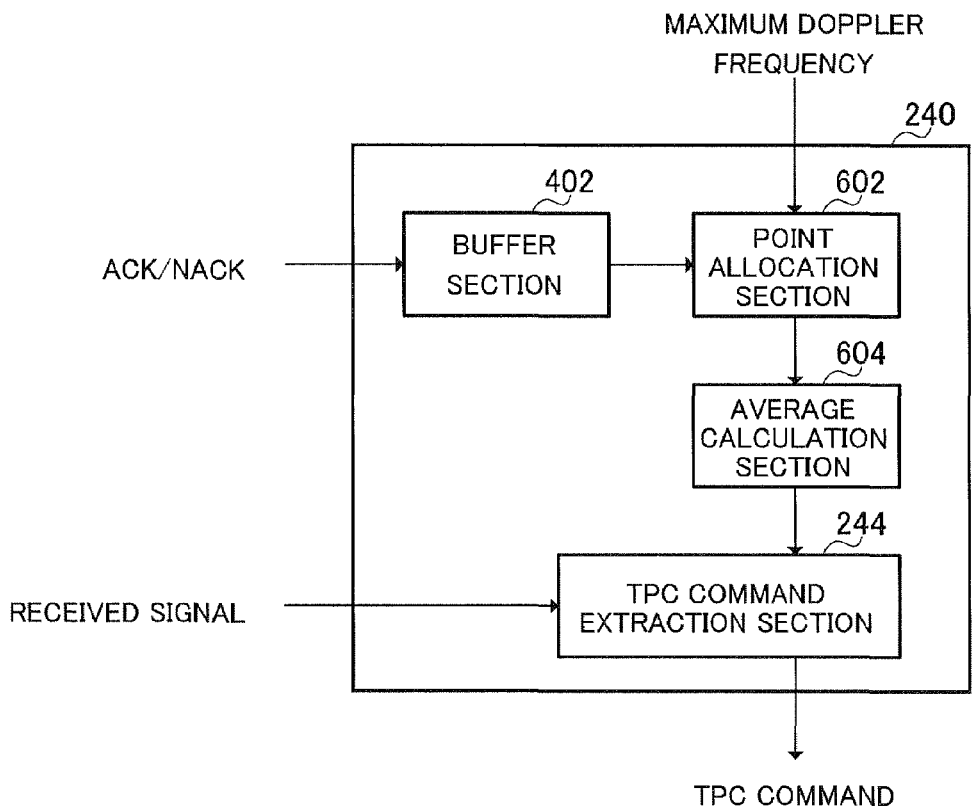
FIG. 8 is a diagram of an example of the history of ACK/NACK according to Embodiment 2.
FIG. 9 is a block diagram showing the internal configuration of the TPC command selection section according to Embodiment 3 of the present invention.

In FIG. 8, base station apparatus #1 having the highest score (that is the highest number of ACK transmissions in TTI interval 500) is judged as having a more stable and favorable uplink propagation environment than those of the other base station apparatuses #2 and #3, and judged that packets transmitted from the mobile station apparatus is correctly transmitted. Thus, by performing transmission power control in accordance with the TPC command from such a base station apparatus, the favorable uplink packet transmission quality can be maintained and the number of retransmissions can be reduced.

Here, ACK counting section 404 determines that the TPC command from base station apparatus #1, which transmitted the greatest number of ACKs in TTI interval 500, is the TPC command of highest priority among those of base station apparatuses #1 to #3. Furthermore, ACK/NACK counting section 404 instructs TPC command extraction section 244 to extract the TPC command transmitted from base station apparatus #1. Then, TPC command extraction section 244 extracts the TPC command of base station apparatus #1 (ST2300) for output to transmission power control section 280.

Next, transmission power control section 280 judges whether or not only one TPC command of highest priority was extracted (ST2400). As a result, as shown in FIG. 8, when the base station apparatus that transmitted the greatest number of ACKs is base station apparatus #1 only (that is, when only one TPC command of highest priority was extracted), the corresponding single TPC command is employed to perform transmission power control (ST2500).

On the other hand, when there are two or more TPC commands of highest priority, in other words when the same greatest number of ACKs are transmitted from a plurality of base station apparatuses, the "or of down" method is applied to the TPC commands of these base station apparatuses (ST2600). That is, even if just one of the base station apparatuses transmits "Down" as the TPC command, transmission power control section 280 decreases the current transmission power. Further, when all base station apparatuses transmits "Up" as the TPC command, transmission power control section 280 increases the current transmission power.

Then, the transmitted data or retransmitted data transmitted via transmitted data buffer section 250, error correction coding section 260, and modulation section 270 are transmitted from RF transmission section 290 via an antenna upon packetizing using the transmission power controlled as described above.

As described above, according to the present embodiment, the TPC command transmitted from the base station apparatus that transmitted the greatest number of ACKs for packets of the TTI interval set in accordance with the maximum Doppler frequency is given highest priority, thereby enabling reflection of whether or not the uplink propagation environment is stable and favorable in the selection of the TPC command.

Furthermore, in the present embodiment, ACKs are simply counted, but only the number of ACKS for packets transmitted for the first time may be counted. Even with the same ACK, an ACK transmitted immediately after a NACK implies that the ACK is for a retransmitted packet and, a retransmission indicates that the uplink transmission quality is considered unfavorable. Thus, ACKs that are transmitted two or more times in a row are judged as ACKs for packets transmitted for the first time, and counting only such ACKs enables more accurate reflection of the uplink propagation environment.

Based on this same concept, for example, an ACK for a packet transmitted for the first time may be counted as one while the ACK for a packet retransmitted may be counted as 0.5 so that the ACKs are counted with weight applied in accordance with the number of retransmissions.

In addition, in the present embodiment, greater weight may be given to ACKs for newer TTIs in the TTI interval. That is, for example, the ACK for the most recent TTI may be counted as one while the ACK for the previous TTI may be counted as 0.5 so that ACKs are counted with weight applied in accordance with the new or old status of the corresponding TTI.

Embodiment 3

Embodiment 3 of the present invention is characterized in that the ACKs and NACKs of a certain time period are quantified and points are allocated accordingly, each point average is established as the score of the respective base station apparatus, the TPC command from the base station apparatus with the highest score is given highest priority, and the mobile station apparatus performs transmission power control based on that TPC command.

The configuration of the base station apparatus according to the present embodiment is the same as that of the base station apparatus (FIG. 1) according to Embodiment 1, and the description thereof is omitted. In addition, the configuration of the mobile station apparatus according to the present embodiment is the same as that of the mobile station apparatus (FIG. 2) according to Embodiment 1, with only the internal configuration of TPC command selection section 240 differing from that of Embodiment 1.

Now the internal configuration of TPC command selection section 240 of the mobile station apparatus according to the present embodiment will be described with reference to FIG. 9. The parts of FIG. 9 that are the same as those of FIG. 3 and FIG. 6 are given the same numerals, and descriptions thereof are omitted.

As shown in FIG. 9, TPC command selection section 240 according to the present embodiment comprises buffer section 402, point allocation section 602, average calculation section 604, and TPC command extraction section 244. Buffer section 402, point allocation section 602, average calculation section 604, and TPC command extraction section 244 mainly operate during a soft handover of the mobile station apparatus.

Point allocation section 602 sets the target TTI interval for ACK/NACK point allocation in accordance with the maximum Doppler frequency, and allocates points to the ACKs/NACKs of each base station apparatus in that TTI interval.

Specifically, point allocation section 602 sets the period from the most recent TTI to a relatively new TTI as the TTI interval when the maximum Doppler frequency is high, or sets the period from the most recent TTI to a relatively old TTI as the TTI interval when the maximum Doppler frequency is low.

Then, point allocation section 602 quantifies the ACKs and NACKs of each base station apparatus by giving, for example, one point for ACK and 0 points for NACK in the TTI interval, and outputs the number of points of each base station apparatus to average calculation section 604.

Average calculation section 604 calculates the point average of each base station apparatus, judges that the transmission quality of the uplink packet of the base station apparatus with the highest average is stable and favorable, and instructs TPC command extraction section 244 to extract that TPC command setting the TPC command of the base station apparatus with the highest average as the TPC command of highest priority.

Next, the TPC command selection operation during a soft handover of the mobile station apparatus configured as described above will be described in detail with reference to FIG. 10 and FIG. 11. Furthermore, in the present embodiment, the operation up until the TPC command and ACK/NACK are transmitted from the base station apparatus to the mobile station apparatus, and the operation up until received signals are demodulated and error corrected by the mobile station apparatus are the same as those of Embodiment 1, and descriptions thereof will be omitted.

Thus, the TPC command selection operation of the TPC command selection section 240 of the mobile station apparatus will now be mainly described.

In the present embodiment, similar to Embodiment 2, error correction decoding section 220 outputs the ACK/NACK of each base station apparatus to buffer section 402. Buffer section 402 stores these ACKs/NACKs as history. Specifically, as shown in FIG. 11 for example, buffer section 402 stores the ACKs/NACKs of each TTI of the respective base station apparatuses #1 to #3.

Figure 10:
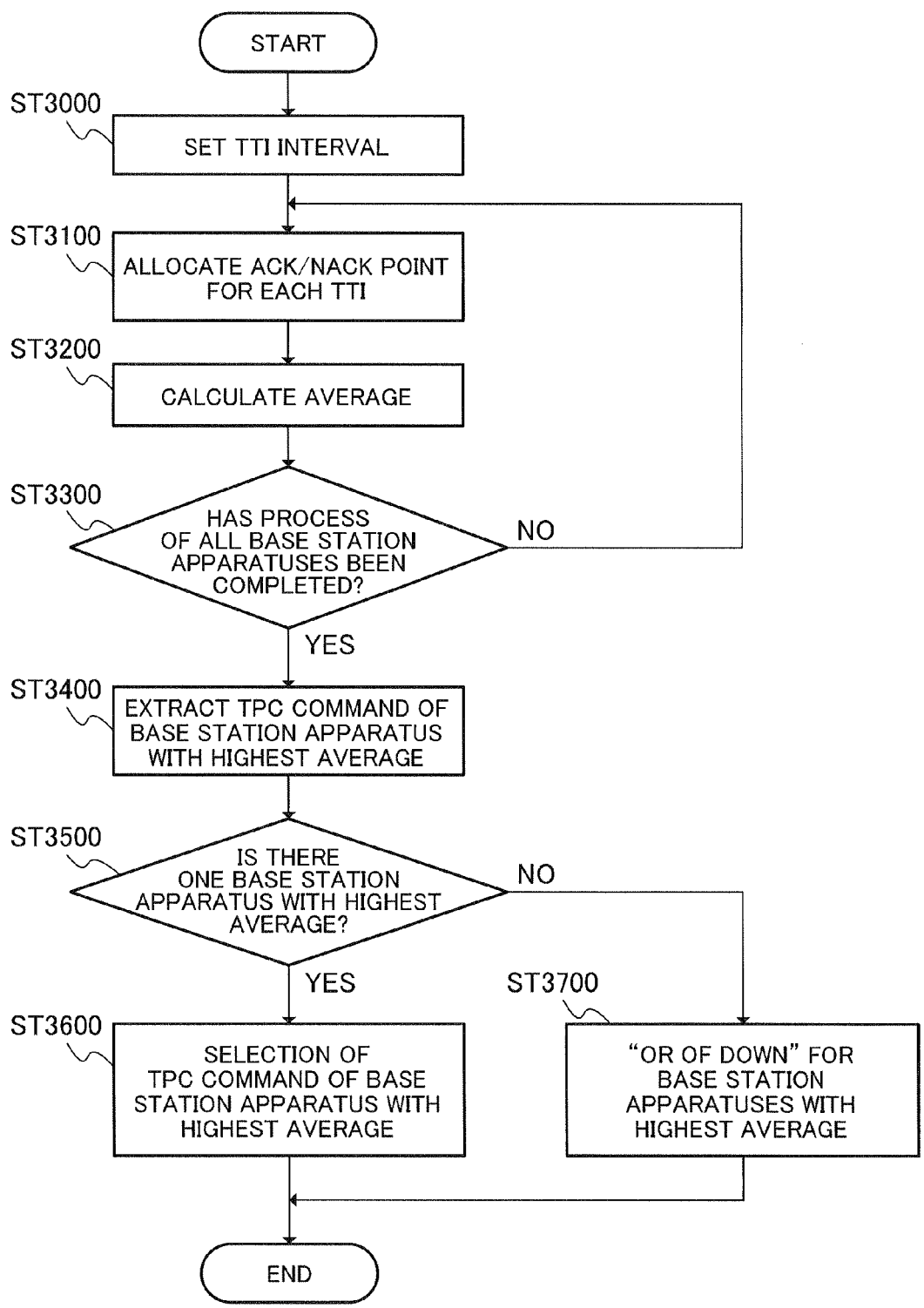
FIG. 10 is a flow chart showing the TPC command selection operation according to Embodiment 3.

Then, TPC command selection section 240 selects the TPC command to be employed for actual transmission power control in accordance with the flow shown in FIG. 10.

That is, first point allocation section 602 sets the TTI interval in accordance with the maximum Doppler frequency (ST3000). The TTI interval of the present embodiment is the number of TTIs subject to ACK/NACK point allocation, and is set so as to target only the relatively new TTIs when the propagation environment changes frequently, or up to the relatively old TTIs when the propagation environment does not change. Thus, a relatively short TTI interval is set when the maximum Doppler frequency is high, and a relatively long TTI interval is set when the maximum Doppler frequency is low.

Then, point allocation section 602 allocates the number of ACK/NACK points for each base station apparatus in the TTI interval (ST3100). Here, for example, the points are allocated by giving one point for ACK and zero points for NACK. Point allocation section 602 outputs the number of points per base station apparatus to average calculation section 604, and average calculation section 604 calculates the average number of points per base station apparatus (ST3200), repeating the process until all base station apparatus related point averages have been calculated (ST3300). In the example shown in FIG. 11, the four TTIs of TTI #0 to TTI #3 framed in by the dashed line are set as TTI interval 700, and first 0.75 (=¾) is calculated as the average of base station apparatus #1, next 0.25 (=¼) is calculated as the average of base station apparatus #2, and finally 0.5 (=2/4) is calculated as the average for base station apparatus #3. These point averages become the scores of the respective base station apparatuses.

Furthermore, in this example, the denominators at the time of average calculation are equal for all base station apparatuses #1 to #3 since all TTI intervals of base station apparatuses #1 to #3 include four TTIs, but the denominators at the time of average calculation may differ when the TTI interval of each base station apparatus differs in accordance with the maximum Doppler frequency. Although uplink transmission qualities cannot be compared based on only the number of ACKs in the TTI interval when the TTI interval differs according to base station apparatus, according to the present embodiment, the uplink transmission quality can be compared by simply comparing the scores of base station apparatuses #1 to #3.

Figures 11, 12:
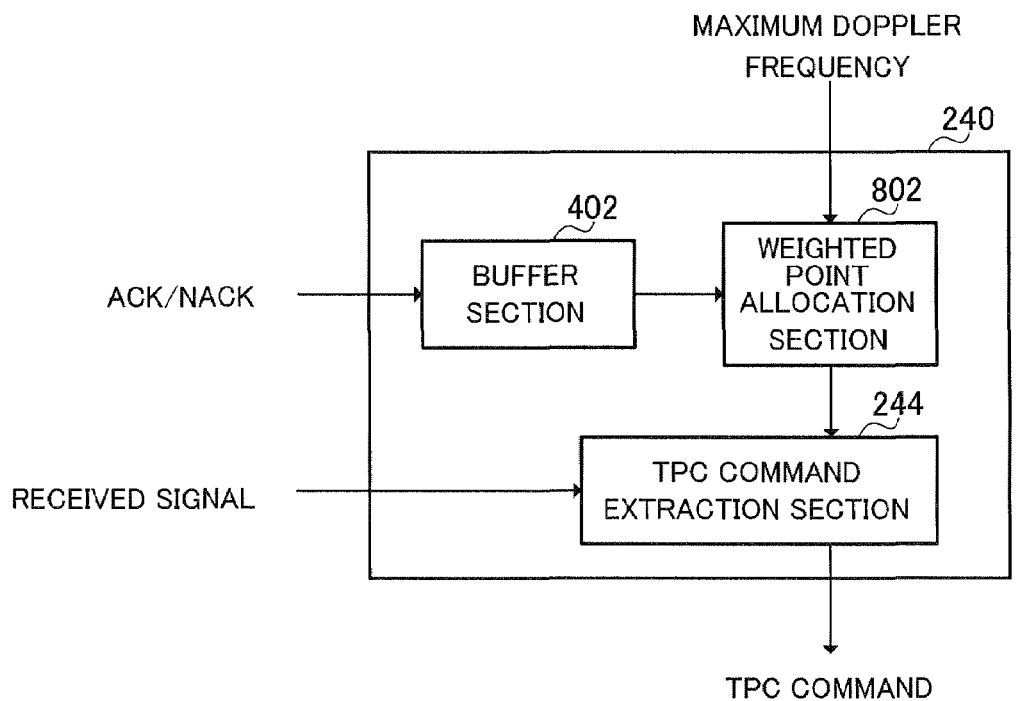
FIG. 11 is a diagram showing an example of the history of ACK/NACK according to Embodiment 3.
FIG. 12 is a block diagram showing the internal configuration of the TPC command selection section according to Embodiment 4 of the present invention.

In FIG. 11, base station apparatus #1 having the highest score (that is the highest point average of the TTI interval) is judged as having a more stable and favorable uplink propagation environment than those of the other base station apparatuses #2 and #3, and judged that packets transmitted from the mobile station apparatus is correctly transmitted. Thus, the favorable uplink packet transmission quality can be maintained and the number of retransmissions can be reduced by performing transmission power control in accordance with the TPC command from such a base station apparatus.

Here, average calculation section 604 determines that the TPC command from base station apparatus #1, having the highest point average of TTI interval 700, is the TPC command of highest priority among those of base station apparatuses #1 to #3. Furthermore, average calculation section 604 notifies TPC command extraction section 244 to extract the TPC command transmitted from base station apparatus #1. Then, TPC command extraction section 244 extracts the TPC command of base station apparatus #1 (ST3400) for output to transmission power control section 280.

Next, transmission power control section 280 judges whether or not only one TPC command of highest priority was extracted (ST3500). As a result, as shown in FIG. 11, when the base station apparatus with the highest point average is base station apparatus #1 only (that is, when only one TPC command of highest priority was extracted), the corresponding single TPC command is employed to perform transmission power control (ST3600).

On the other hand, when there are two or more TPC command of highest priority, in other words, when the point averages of a plurality of base station apparatuses are equally greatest, the "or of down" method is applied to the TPC commands of these base station apparatuses (ST3700). That is, even if just one of the base station apparatuses transmits "Down" as the TPC command, transmission power control section 280 decreases the current transmission power. Further, when all base station apparatuses transmits "Up" as the TPC command, transmission power control section 280 increases the current transmission power.

Then, the transmitted data or retransmitted data transmitted via transmitted data buffer section 250, error correction coding section 260, and modulation section 270 are transmitted from RF transmission section 290 via an antenna upon packetizing using the transmission power controlled as described above.

As described above, according to the present embodiment, the TPC command transmitted from the base station apparatus with the highest average number of points given to the ACKs/NACKs for packets of the TTI interval set in accordance with the maximum Doppler frequency is given highest priority, thereby enabling reflection of whether or not the uplink propagation environment is stable and favorable in the selection of the TPC command.

Furthermore, in the present embodiment, the average calculated per base station apparatus may be compared with an established threshold value and the "or of down" method applied to those base station apparatuses having an average value greater than or equal to the predetermined threshold value. The present embodiment, unlike Embodiment 2, takes into consideration the ratio of ACKs and NACKs in the TTI interval by allocating points to the ACKs/NACKs in the TTI interval. As a result, the average of the number of points is determined using the threshold value, thereby establishing an absolute standard for the ACK/NACK ratio, making it possible to reliably eliminate the base station apparatuses with poor uplink transmission quality. Thus, determination of the absolute value enables not only relative comparison of base station apparatuses, but also reflection of the absolute favorable or unfavorable status of the uplink transmission quality.

Embodiment 4

Embodiment 4 of the present invention is characterized in that a score of each base station apparatus is calculated by multiplying a past calculated score of the base station apparatus by a forgetting coefficient and adding the number of points resulting from the quantification of the ACK/NACK newly transmitted from the base station apparatus, the TPC command from the base station apparatus with the highest score is given highest priority, and the mobile station apparatus performs transmission power control based on that TPC command.

The configuration of the base station apparatus according to the present embodiment is the same as that of the base station apparatus (FIG. 1) according to Embodiment 1, and the description thereof is omitted.

In addition, the configuration of the mobile station apparatus according to the present embodiment is the same as that of the mobile station apparatus (FIG. 2) according to Embodiment 1, with only the internal configuration of TPC command selection section 240 differing from that of Embodiment 1.

Now the internal configuration of TPC command selection section 240 of the mobile station apparatus according to the present embodiment will be described with reference to FIG. 12. The parts of FIG. 12 that are the same as those of FIG. 3 and FIG. 6 are given the same numerals, and descriptions thereof are omitted.

As shown in FIG. 12, TPC command selection section 240 according to the present embodiment comprises buffer section 402, weighted point allocation section 802, and TPC command extraction section 244. Buffer section 402, weighted point allocation section 802, and TPC command extraction section 244 mainly operate during a soft handover of the mobile station apparatus.

Weighted point allocation section 802 determines the forgetting coefficient for the previously calculated score in accordance with the maximum Doppler frequency, and calculates the current score by adding the number of points allocated to the new ACK/NACK to the previous score multiplied by the forgetting coefficient.

Specifically, weighted point allocation section 802 multiplies the previous score by a forgetting factor that relatively decreases the weight of the previous score when the maximum Doppler frequency is high, or multiplies the previous score by a forgetting coefficient that relatively increases the weight of the previous score when the maximum Doppler frequency is low.

Then, weighted point allocation section 802 calculates the current score by adding the number of points for the ACK/NACK (for example, one point for ACK and zero points for NACK) transmitted from the base station apparatus after calculation of the previous score to the previous score multiplied by the forgetting coefficient. Furthermore, weighted point allocation section 802 judges that the transmission quality of the uplink packet of the base station apparatus with the highest calculated current score is stable and favorable, sets the TPC command of the base station apparatus with the highest current score as the TPC command of highest priority, and instructs TPC command extraction section 244 to extract that TPC command.

Next, the TPC command selection operation during a soft handover of the mobile station apparatus configured as described above will be described in detail with reference to FIG. 13. Furthermore, in the present embodiment, the operation up until the TPC command and ACK/NACK are transmitted from the base station apparatus to the mobile station apparatus, and the operation up until received signals are demodulated and error corrected by the mobile station apparatus are the same as those of Embodiment 1, and descriptions thereof will be omitted.

Thus, the TPC command selection operation of the TPC command selection section 240 of the mobile station apparatus will now be mainly described.

In the present embodiment, similar to Embodiment 2, error correction decoding section 220 outputs the ACK/NACK of each base station apparatus to buffer section 402. Buffer section 402 stores these ACKs/NACKs as history.

Figure 13:
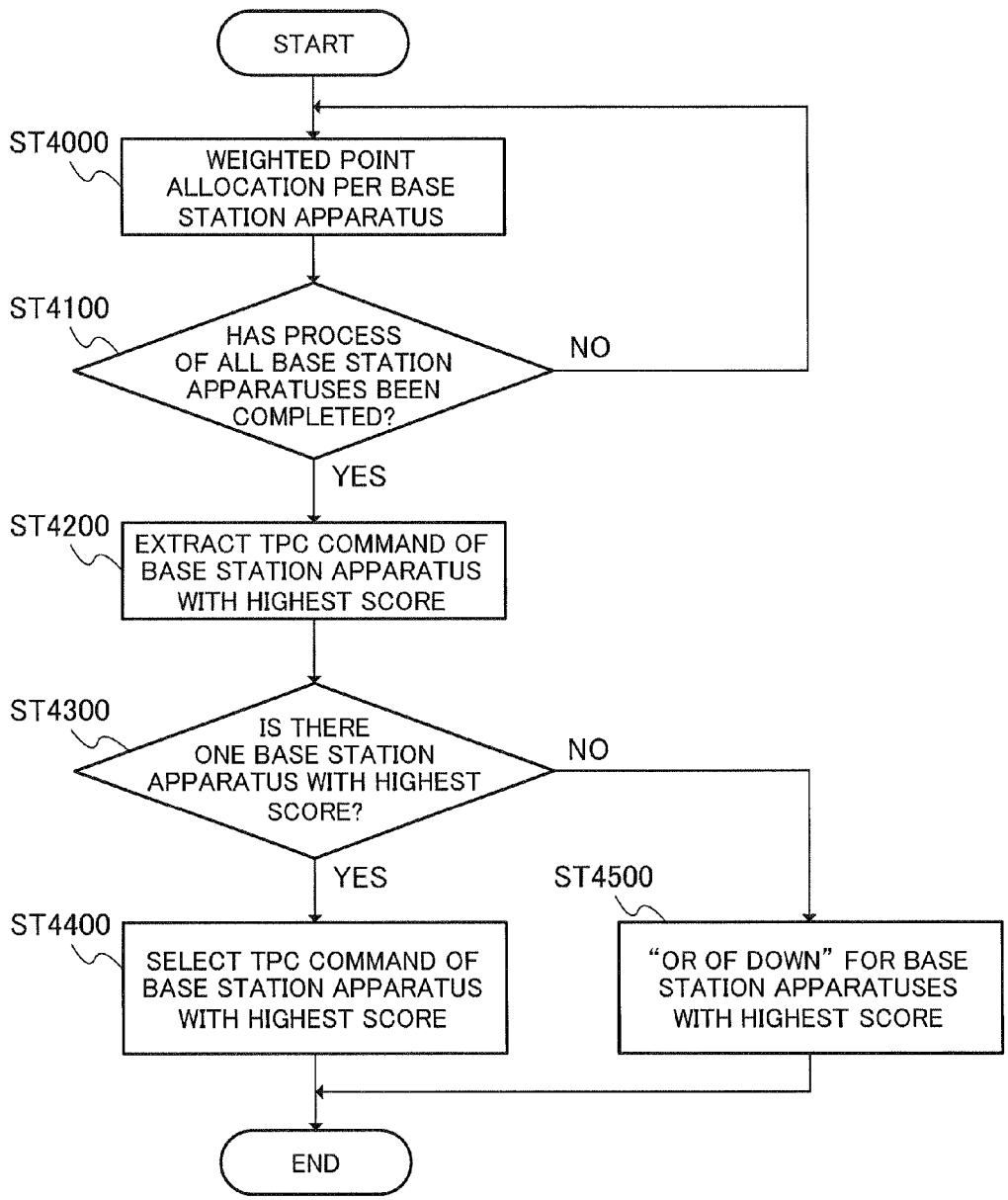
FIG. 13 is a flow chart showing the TPC command selection operation of Embodiment 4.
Figures 14, 15:
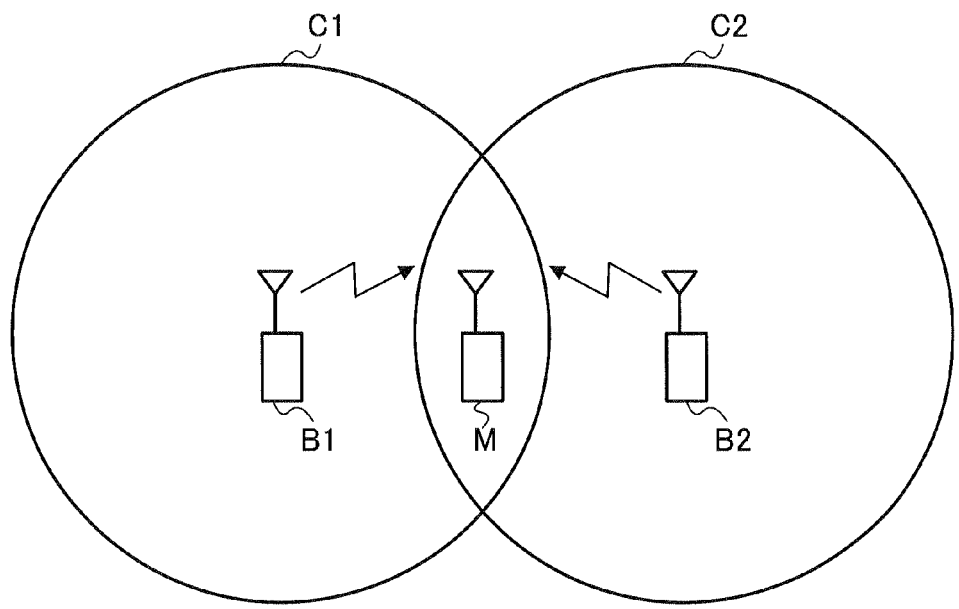
FIG. 14 is a diagram showing an example of a mobile communication system.
FIG. 15 is a diagram showing an example of the "or of down" method of transmission power control.

Then, TPC command selection section 240 selects the TPC command to be employed for actual transmission power control in accordance with the flow shown in FIG. 13.

That is, first weighted point allocation section 802 calculates a weighted score per base station apparatus (ST4000). Specifically, first weighted point allocation section 802 determines the forgetting coefficient corresponding to the maximum Doppler frequency and multiples the previously calculated score by the forgetting coefficient. The forgetting coefficient is determined as a value that relatively decreases the weight of the previous score when the propagation environment changes frequently, and is determined as a value that relatively increases the weight of the previous score when the propagation environment does not change. Thus, a relatively small forgetting coefficient is determined when the maximum Doppler frequency is high, and a relatively high forgetting coefficient is determined when the maximum Doppler frequency is low.

Then, weighted point allocation section 802 refers to buffer section 402 and allocates points to the new ACK/NACK transmitted from the base station apparatus after calculation of the previous score. The number of points allocated to ACK/NACK is calculated by quantifying ACK and NACK as, for example, one point and zero points, respectively. Furthermore, weighted point allocation section 802 calculates the current score by adding the number of points for the new ACK/NACK to the previous score multiplied by the forgetting coefficient. Weighted point allocation section 802 sets the forgetting coefficient to zero at the time of initial score calculation, not taking into consideration a previous score. In this manner, weighted point allocation section 802 calculates the temporal weighted score of each base station apparatus, repeating the process until current scores are calculated for all base station apparatuses (ST4100).

The base station apparatus with the highest current score calculated in this manner is judged as having a favorable uplink propagation path, even when taking into consideration conditions up to the previous point allocation, and judged that packets transmitted from the mobile station apparatus are correctly transmitted. Thus, by performing transmission power control in accordance with the TPC command from such a base station apparatus, the favorable uplink packet transmission quality can be maintained and the number of retransmissions can be reduced.

Here, weighted point allocation section 802 determines that the TPC command from the base station apparatus with the highest current score has highest priority. Furthermore, weighted point allocation section 802 instructs TPC command extraction section 244 to extract the TPC command of highest priority. Then, TPC command extraction section 244 extracts the TPC command instructed by weighted point allocation section 802 (ST4200) for output to transmission power control section 280.

Next, transmission power control section 280 judges whether or not only one TPC command of highest priority was extracted (ST4300). As a result, when there is only one base station apparatus with the highest current score (that is, when only one TPC command of highest priority was extracted), the corresponding single TPC command is employed to perform transmission power control (ST4400).

On the other hand, when there are two or more extracted TPC commands, in other words, when the current scores of a plurality of base station apparatuses are equally highest, the "or of down" method is applied to the TPC commands of these base station apparatuses (ST4500). That is, even if just one of the base station apparatuses transmits "Down" as the TPC command, transmission power control section 280 decreases the current transmission power. Further, when all base station apparatuses transmit "Up" as the TPC command, transmission power control section 280 increases the current transmission power.

Then, the transmitted data or retransmitted data transmitted via transmitted data buffer section 250, error correction coding section 260, and modulation section 270 are transmitted from RF transmission section 290 via an antenna upon packetizing using the transmission power controlled as described above.

In this manner, according to the present embodiment, the current score is calculated by multiplying the previous score by a forgetting coefficient determined in accordance with the maximum Doppler frequency and adding to the previous score multiplied by the forgetting coefficient the points of the new ACK/NACK. Then, the TPC command transmitted from the base station apparatus with the highest current score is given highest priority, thereby reflecting whether or not the uplink propagation environment is stable and favorable in the selection of the TPC command.

Furthermore, the above-mentioned Embodiments 2 to 4 use the maximum Doppler frequency to determine the TTI interval setting and forgetting coefficient, but each base station apparatus may measure the maximum Doppler frequency of the uplink and notify the mobile station apparatus of the result. In addition, the examples shown in FIG. 8 and FIG. 11 use a common TTI interval set in accordance with the maximum Doppler frequency for all base station apparatuses #1 to #3, but a different TTI interval may be set for each of the base station apparatuses #1 to #3 since the measured maximum Doppler frequency may actually differ for each base station apparatus. Similarly, the forgetting coefficient in Embodiment 4 may differ for each base station apparatus as well.

In addition, in the above-mentioned Embodiments 3 and 4, points were allocated by quantifying ACK and NACK as one point and zero points, respectively, but the points to be allocated respectively may be arbitrary.

In addition, in the above Embodiments 3 and 4, the ACK points for a packet transmitted for the first time and the ACK points for packets retransmitted may be set higher and lower, respectively. Even if the ACK is the same ACK, an ACK transmitted immediately after a NACK implies that the ACK is for a retransmitted packet, and retransmission indicates that the uplink transmission quality is considered unfavorable. Thus, ACKs transmitted two or more times in a row are identified as ACKs for packets transmitted for the first time and, through the allocation of a higher number of points for such ACKs, the uplink propagation path can be reflected more accurately.

Based on this same concept, a point slope may be established in accordance with the number of times NACK is consecutively returned prior to ACK. That is, for example, a relatively high number of points may be allocated when NACK occurs once prior to ACK since retransmission occurs only once, and a relatively low number of points may be allocated when NACK occurs two times in a row prior to ACK since retransmission occurs twice.

The mobile station apparatus according to a first aspect of the present invention employs a configuration having a reception section that receives from a plurality of base station apparatuses receipt acknowledgement responses and transmission power control commands for an uplink signal, a selection section that selects from a plurality of the received transmission power control commands the transmission power control command of highest priority using a plurality of the received receipt acknowledgement responses, and a control section that controls the transmission power in accordance with the selected transmission power control command.

According to this configuration, transmission power control is performed by selecting from the TPC commands corresponding to each base station apparatus the TPC command of highest priority based on the respective receipt acknowledgment responses received from a plurality of base station apparatuses. As a result, information related to whether or not the uplink transmitted signal was correctly received by the base station apparatus is reflected in the selection of the TPC command, thereby enabling selection of a TPC command that more reliably improves the transmission quality of the uplink packet and, as a result, decreases the number of uplink retransmissions and improves sector throughput.

The mobile station apparatus according to a second aspect of the present invention employs a configuration in accordance with the above-mentioned first aspect wherein the selection section further comprises a judgment that judges whether the most recently received receipt acknowledgement response of each base station apparatus is ACK, which indicates successful reception, or NACK, which indicates failed reception, and an extraction section that extracts the transmission power control command transmitted from the base station apparatus having an ACK receipt acknowledgement response as a result of judgment.

According to this configuration, the TPC command from the base station apparatus that transmitted ACK as the most recent receipt acknowledgement response is extracted, thereby enabling selection of TPC command reflecting the latest uplink transmission quality and realization of appropriate TPC command selection using a simple circuit configuration.

The mobile station apparatus according to a third aspect of the present invention employs a configuration in accordance with the above-mentioned first aspect wherein the selection section selects the transmission power control command of highest priority based on receipt acknowledgement responses received in the past.

According to this configuration, the TPC command is selected using receipt acknowledgement responses received in the past, thereby enabling selection of the TPC command of the base station apparatus that has had a stable and favorable uplink transmission quality over a long period of time.

The mobile station apparatus according to a fourth aspect of the present invention employs a configuration in accordance with the above-mentioned third aspect wherein the selection section reflects past receipt acknowledgement responses in accordance with the maximum Doppler frequency in the selection of the transmission power control command.

According to this configuration, past receipt acknowledgement responses are used in accordance with the maximum Doppler frequency, thereby enabling determination of the interval of target receipt acknowledgement responses and the weight applied to past receipt acknowledgement responses while taking into consideration the rate of fading variation, as well as a more accurate reflection of the transmission quality of the uplink over a long period of time in the selection of the TPC command.

The mobile station apparatus according to a fifth aspect of the present invention employs a configuration in accordance with the above-mentioned third aspect wherein the selection section further comprises a buffer section that stores the history of received receipt acknowledgement responses per base station apparatus, a quantification section that quantifies the received receipt acknowledgement responses to establish a score per base station apparatus, and an extraction section that extracts the transmission power control command transmitted from the base station apparatus with the highest score.

According to this configuration, in the history of receipt acknowledgement responses per base station apparatus, the ACKs and NACKs are quantified to establish a score per base station apparatus, and the TPC command transmitted from the base station apparatus with the highest score is extracted. As a result, past receipt acknowledgement responses are reliably reflected in the selection of the TPC command, and the process is simplified by ACK and NACK quantification.

The mobile station apparatus according to a sixth aspect of the present invention employs a configuration in accordance with the above-mentioned fifth aspect wherein the quantification section further comprises a counting section that counts the number of ACKs of receipt acknowledgement responses within a predetermined interval to establish a score per base station apparatus.

According to this configuration, the number of ACKs within a predetermined interval is used to establish a score per base station apparatus, thereby enabling selection of the base station apparatus having a stable and favorable uplink transmission quality using a minimal amount of calculation.

The mobile station apparatus according to a seventh aspect of the present invention employs a configuration in accordance with the above-mentioned fifth aspect wherein the quantification section further comprises a point allocation section that allocates points for the receipt acknowledgement responses within a predetermined interval, and a calculation section that calculates the point average per base station apparatus within the predetermined interval to establish a score per base station apparatus.

According to this configuration, the number of points for receipt acknowledgement responses within a predetermined interval are averaged to establish a score per base station apparatus, thereby enabling simple comparison of the scores of each base station apparatus and selection of the base station apparatus having a stable and favorable uplink transmission quality, even when the predetermined interval differs for each base station apparatus. In addition, the averages are compared with a predetermined threshold, enabling not only relative comparison of the base station apparatuses but also establishment of an absolute standard for the uplink transmission quality.

The mobile station apparatus according to an eighth aspect of the present invention employs a configuration in accordance with the above-mentioned fifth aspect wherein the quantification section further comprises a weighted point allocation section that calculates the current score per base station apparatus by applying weight to the previous score of the base station apparatus and adding to the weighted score the points allocated to the newly received receipt acknowledgment response.

According to this configuration, the current score is established by applying weight to the previous score of each base station apparatus and adding the points for the new receipt acknowledgement response, thereby enabling comparison of the uplink transmission quality taking into consideration all past receipt acknowledgement responses and, in consequence, achieving more reliable selection of the TPC command of the base station apparatus with a favorable uplink transmission quality.

The mobile station apparatus according to a ninth aspect of the present invention employs a configuration in accordance with the above-mentioned eighth aspect wherein the weighted point allocation section applies weight to the previous score of each base station apparatus in accordance with the maximum Doppler frequency.

According to this configuration, weight is applied to the previous score of each base station apparatus in accordance with the maximum Doppler frequency, thereby enabling determination of a forgetting coefficient taking into consideration the rate of fading variation and achieving more accurate reflection of the uplink transmission quality over a long period of time in the selection of the TPC command.

The mobile station apparatus according to a tenth aspect of the present invention employs a configuration in accordance with the above-mentioned fifth aspect wherein the quantification section quantifies ACKs for signals transmitted for the first time and ACKs for signals retransmitted using different values.

According to this configuration, a different number of points are allocated to ACKs for signals transmitted for the first time and ACKs for signals retransmitted, thereby enabling counting of only those ACKS for signals transmitted for the first time as ACKS or the allocation of a lower number of points for those ACKS for signals retransmitted, resulting in a more exact assessment of the uplink transmission quality.

The mobile station apparatus according to an eleventh aspect of the present invention employs a configuration in accordance with the above-mentioned first aspect wherein the control section decreases the transmission power when a plurality of transmission power control commands are selected and at least one of the transmission power control commands to decrease transmission power is selected.

According to this configuration, the transmission power is decreased even if just one of a plurality of TPC commands to decrease transmission power, thereby enabling prevention of a great increase in interference in the overall system as well as an increase in subscriber capacity.

The uplink transmission power control method according to a twelfth aspect of the present invention comprises the steps of receiving from a plurality of base station apparatuses receipt acknowledgement responses and transmission power control commands for an uplink signal, selecting from a plurality of the received transmission power control commands the transmission power control command of highest priority based on a plurality of the received receipt acknowledgement responses, and controlling the transmission power in accordance with the selected transmission power control command.

According to this configuration, the transmission power is controlled by selecting from the TPC commands corresponding to each base station apparatus the TPC command of highest priority based on the respective receipt acknowledgment responses received from a plurality of base station apparatuses. As a result, information related to whether or not the uplink transmitted signal was correctly received by the base station apparatus is reflected in the selection of the TPC command, thereby enabling selection of a TPC command that more reliably improves the transmission quality of the uplink packet and, as a result, decreases the number of uplink retransmissions and improves sector throughput.

The present application is based on Japanese Patent Application No. 2004-265491, filed on Sep. 13, 2004, the entire content of which is expressly incorporated by reference herein.

INDUSTRIAL APPLICABILITY

The mobile station apparatus and uplink transmission power control method according to the present invention selects the TPC command that more reliably improves the transmission quality of the uplink packet and, as a result, decreases the number of uplink retransmissions and improves sector throughput, making the invention effective as, for example, a mobile station apparatus and uplink transmission power control method for executing soft handover during movement between cells.

The invention claimed is:

1. A mobile station apparatus comprising:
 a reception section that receives from a plurality of base station apparatuses receipt acknowledgement responses and transmission power control commands for an uplink signal;
 a selection section that selects from a plurality of the received transmission power control commands the transmission power control command of highest priority using a plurality of the received receipt acknowledgement responses; and
 a control section that controls the transmission power in accordance with the selected transmission power control command.

2. The mobile station apparatus according to claim 1, wherein the selection section further comprises:
 a judgment section that judges whether the most recently received receipt acknowledgement response of each base station apparatus is ACK, which indicates successful reception, or NACK, which indicates failed reception; and
 an extraction section that extracts the transmission power control command transmitted from the base station apparatus having an ACK receipt acknowledgement response as a result of judgment.

3. The mobile station apparatus according to claim 1, wherein the selection section selects the transmission power control command of highest priority based on receipt acknowledgment responses received in the past.

4. The mobile station apparatus according to claim 3, wherein the selection section reflects past receipt acknowledgement responses in accordance with the maximum Doppler frequency in the selection of the transmission power control command.

5. The mobile station apparatus according to claim 3, wherein the selection section further comprises:
 a buffer section that stores history of received receipt acknowledgement responses per base station apparatus;
 a quantification section that quantifies the received receipt acknowledgement responses to establish a score per base station apparatus; and
 an extraction section that extracts the transmission power control command transmitted from the base station apparatus with the highest score.

6. The mobile station apparatus according to claim 5, wherein the quantification section further comprises a counting section that counts the number of ACKs of receipt acknowledgement responses within a predetermined interval to establish a score per base station apparatus.

7. The mobile station apparatus according to claim 5, wherein the quantification section further comprises:
 a point allocation section that allocates points for the receipt acknowledgement responses within a predetermined interval; and
 a calculation section that calculates the point average per base station apparatus within the predetermined interval to establish a score per base station apparatus.

8. The mobile station apparatus according to claim 5, wherein the quantification section further comprises a weighted point allocation section that calculates the current score per base station apparatus by applying weight to the previous score of each base station apparatus and adding to the weighted score the points allocated for the newly received receipt acknowledgement response.

9. The mobile station apparatus according to claim 8, wherein the weighted point allocation section applies weight to the previous score of each base station apparatus in accordance with the maximum Doppler frequency.

10. The mobile station apparatus according to claim 5, wherein the quantification section quantifies the ACKs for signals transmitted for the first time and the ACKs for signals retransmitted using different values.

11. The mobile station apparatus according to claim 1, wherein the control section decreases the transmission power when a plurality of transmission power control commands are selected and at least one of the transmission power control commands to decrease transmission power is selected.

12. An uplink transmission power control method comprising the steps of:
 receiving from a plurality of base station apparatuses receipt acknowledgement responses and transmission power control commands for an uplink signal;
 selecting from a plurality of the received transmission power control commands the transmission power control command of highest priority using a plurality of the received receipt acknowledgement responses; and
 controlling the transmission power in accordance with the selected transmission power control command.

* * * * *